United States Patent [19]

Johnston

[11] 4,333,155
[45] Jun. 1, 1982

[54] CALCULATOR HAVING A MODULAR KEYBOARD

[75] Inventor: John N. Johnston, North Plainfield, N.J.

[73] Assignee: Litton Business Systems, Inc., Morris Plains, N.J.

[21] Appl. No.: 40,131

[22] Filed: May 18, 1979

[51] Int. Cl.³ .............................................. G06F 1/00
[52] U.S. Cl. ............................... 364/708; 340/365 R; 364/709
[58] Field of Search ............... 364/708, 709, 715, 706; 340/965 R; 235/145 R; 200/5 R, 5 A

[56] References Cited

U.S. PATENT DOCUMENTS

| | | | |
|---|---|---|---|
| 3,394,368 | 7/1968 | Carr et al. ........................ | 340/365 R |
| 3,839,630 | 10/1974 | Olander, Jr. et al. ............... | 364/706 |
| 3,978,328 | 8/1976 | Fabry et al. ........................ | 364/709 |
| 4,092,527 | 5/1978 | Luecke .............................. | 364/708 |
| 4,181,966 | 1/1980 | Wenninger et al. ................ | 364/709 |

Primary Examiner—Errol A. Krass
Attorney, Agent, or Firm—Michael H. Wallach; Robert F. Rotella

[57] ABSTRACT

A calculator having a keyboard alterable by interchanging various keyboard modules is provided by an arrangement wherein a module is insertable into a floating connector which adjusts the space allowed for the module to the size of the module and which provides reliable electrical connection to a main keyboard. Each module is insertable and removable with one hand by providing a resilient camming member attached to the calculator, which mechanically interacts with a locking and releasing member which is connected to the module and is accessible when the calculator is resting on a desk.

10 Claims, 6 Drawing Figures

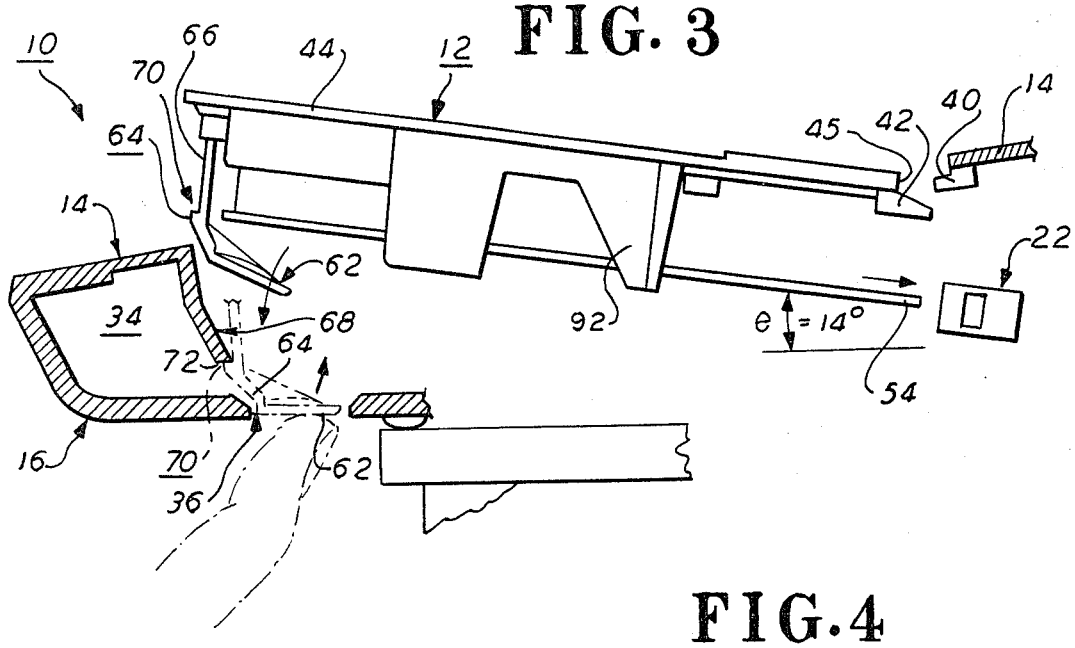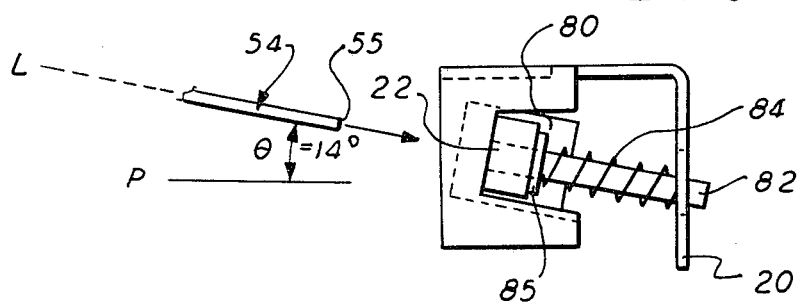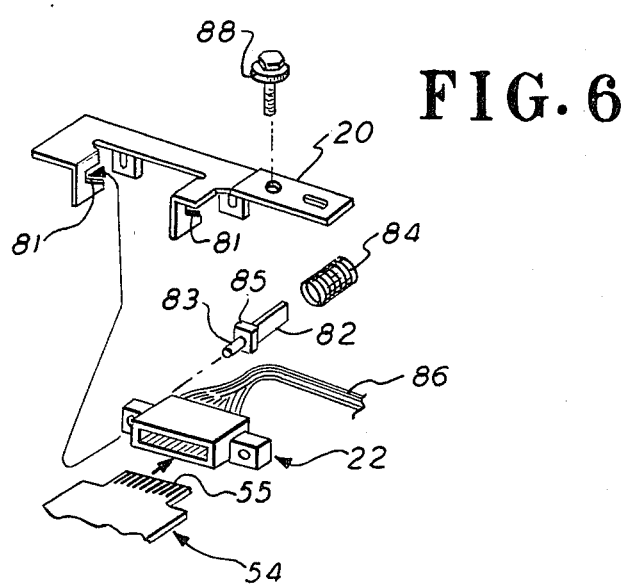

CALCULATOR HAVING A MODULAR KEYBOARD

BACKGROUND OF THE INVENTION

1. Field of the Invention

The present invention relates to an electronic calculator with an alterable keyboard and more particularly to an electronic desk-top calculator with a manually changeable keyboard, the size of which may vary.

2. Description of the Prior Art

Prior art keyboard modules and similar articles generally must correspond nearly exactly in size with the apertures into which they are inserted. In addition, for removal such modules and the associated devices into which they are inserted are so constructed that a plurality of releasing members must be actuated or the associated devices must be partially disassembled or lifted or turned over to permit access to the module.

A signal switching system and control keyboard suitable for use therein is disclosed in Carr et al., U.S. Pat. No. 3,394,368. Carr et al. describes a control keyboard containing a replaceable reversible magazine of different legend-bearing plates each actuable automatically to a visible position to identify the functions of associated control switches when a corresponding function switch is operated. Coding members on the magazine and on the plates provide control signals indicating which magazine, in which orientation, is in the keyboard and which plate is actuated to visible position at any time, and these control signals are used to control selection of the data displayed under control of the keyboard.

A key operated switch is disclosed in Feder, U.S. Pat. No. 3,663,774, including a system which uses a plug-in type printed circuit module and associated circuitry for sending a signal representing a binary coded decimal digit. There is described an actuation cylinder having a conductive contact bar mounted therein and a key slot through the center. A circuit means is provided for connecting the actuation cylinder bar and external circuitry when the actuation cylinder is rotated. The actuation switch is insertable into a magazine.

An expandable keyboard for electronic pocket calculators and the like is disclosed in Margolin, U.S. Pat. No. 3,940,758. Margolin describes an expandable keyboard for a pocket type calculator. The keyboard is made in a modular form and electrically interconnects and forms a keyboard much larger than that of a familiar pocket calculator. The keyboard portions are hinged together normally forming a stack, which occupies along with the display and the electronics, a space about as large as a conventional pocket calculator. The portions hinge or snap fit in a side by side relationship with a main portion conveniently affixed to a housing for the electronics for the various functions. Electrical interconnection between the side portions of the modular or folding keyboard arrangement is achieved at the edges of the portions by means of arrays of electrical interfaces exposed at the mating edges for interconnection.

SUMMARY OF THE INVENTION

The present invention is directed toward a calculator having a keyboard which is alterable by interchanging various keyboard modules. A module is provided which is insertable into a floating connector which adjusts the space allowed for the module and which provides reliable electrical connection to a main keyboard. Each module is insertable or removable with one hand by providing a camming member, attached to the calculator and accessible when the calculator is resting on a desk, which mechanically interacts with a locking and releasing member connected to the module.

BRIEF DESCRIPTION OF THE DRAWINGS

FIG. 3 is a detailed side view of the keyboard module and a view partially in cross section of the mechanism for insertion and removal of the keyboard module;

FIG. 4 is a side view, partially in cross-section of the mechanism for receiving the printed circuit board plug of the keyboard module prior to insertion of the module into the calculator;

FIG. 6 is an exploded perspective view of the connector assembly for receiving the printed circuit board plug of the keyboard module.

DESCRIPTION OF THE PREFERRED EMBODIMENT

Figure 1:
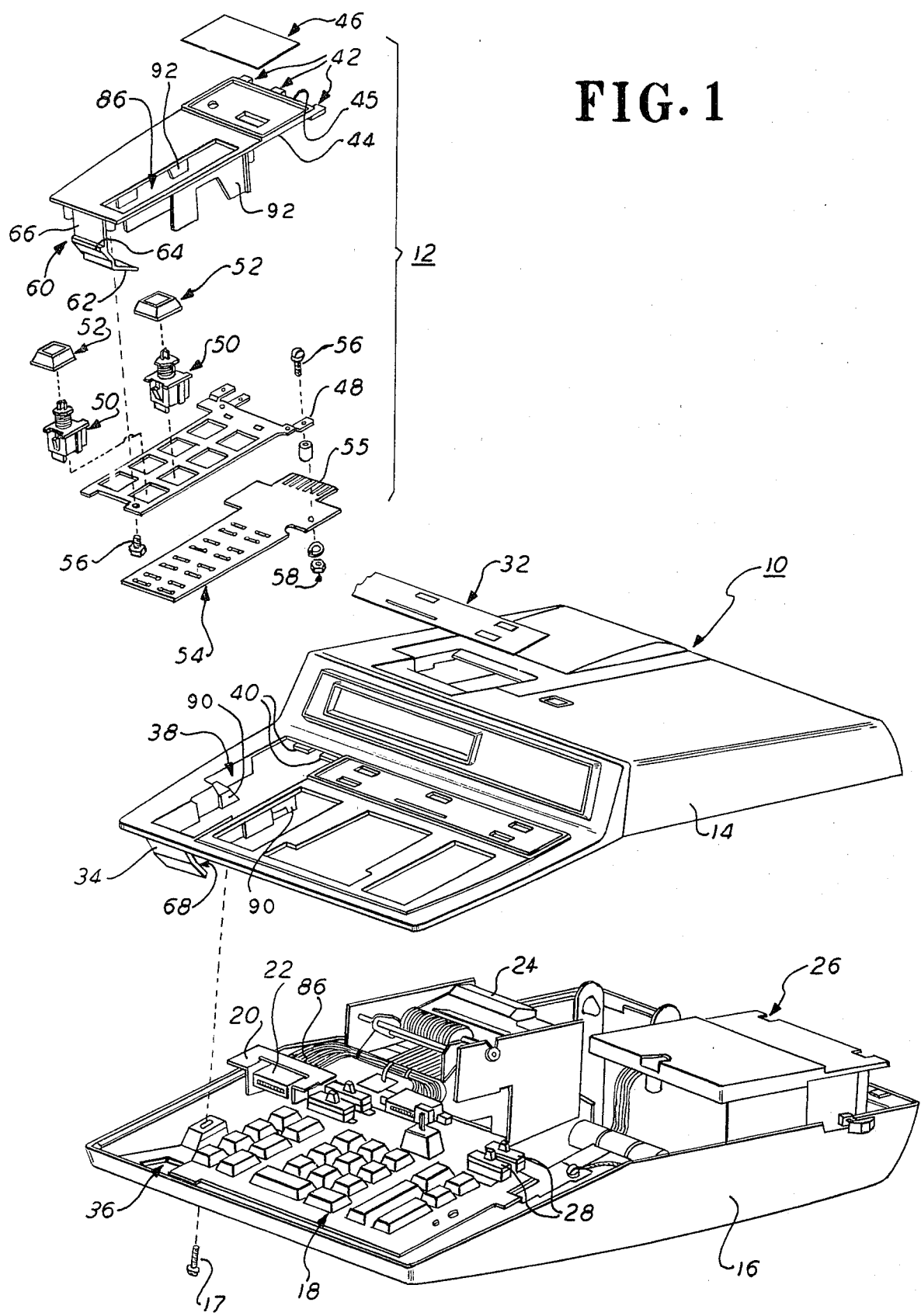
FIG. 1 is an exploded view of a calculator constructed in accordance with the invention.

FIG. 1 shows an exploded view of an illustrative calculator 10 incorporating a key board module 12 constructed in accordance with the present invention. As used herein, the term "keyboard" includes a keyboard having one or more key switches.

The calculator 10 includes a keyboard frame 14 which is attached to a bottom cover 16 by a plurality of screws 17. Mounted in the bottom cover 16 are a main keyboard 18 and a bracket 20 which slidably and rotatably supports a connector 22 on the bottom cover 16. Also mounted on the bottom cover 16 are a conventional printer 24, power supply 26 and miscellaneous switching mechanisms 28. A cover plate 32 showing various functions of the switching mechanisms 28 is mounted on the top of the keyboard frame 14.

A camming member 34 is provided as an integral part of the keyboard frame 14. When the keyboard frame 14 is mounted to the bottom cover 16 the camming member 34 extends downwardly above an aperture 36 which is located in the bottom of the bottom cover 16 near the front edge of the calculator 10 and adjacent and to the side of the main keyboard 18. When the calculator 10 is assembled, the aperture 36 permits access—for example, by a finger—for removal of the keyboard module 12 as will be described in greater detail below. An opening 38 is provided in the keyboard frame 14 for receiving the keyboard module 12 and has a plurality of prongs 40, integral with the keyboard frame 14, extending therefrom slightly below the upper surface of the frame 11 into the opening 38. The keyboard module 12 has a plurality of prongs 42, attached to a module frame 44, which engage with the prongs 40 on the keyboard frame 14 and retain the rear edge 45 of the module frame 44 to which the prongs 42 are attached within the keyboard frame 14.

The keyboard module 12 is an assembly of the module frame 44, a cover plate 46 which is glued into a recess provided in the module frame 44, a keyboard frame 48, a plurality of keys 50 (only two keys 50 are shown) assembled within the keyboard frame 48 (each having a function cap 52 attached thereon), and a printed circuit board 54 providing the desired electrical connections and having a connector or plug 55. The keys 50 and printed circuit board 54 are secured to the module frame 44 by a plurality of screws 56 and bolts 58.

The keyboard module frame 44 has integral therewith and extending downwardly therefrom a flexible member 60 which includes a number of integral sub parts which permit cooperation in a camming manner with the camming member 34 of the keyboard frame 14. The flexible member 60 (see FIGS. 2 and 3) includes a lower end tab 62, which extends below and toward the rear of the keyboard module 12, and which is digitally accessible through the aperture 36 from below the bottom cover 16, and a camming portion 64 which extends laterally from the lowermost extremity of the surface of an upper vertical portion 66 of the flexible member 60. The camming portion 64 has a flat upper surface 70 and interacts with a camming surface 68 of the camming member 34 and, when the keyboard module 12 and the flexible member 60 are pushed down into the opening 38 in the keyboard frame 14, the camming portion 64 slides along the surface 68 of the camming member 34 until the surface 70 is below the lower end surface 72 of the camming member 34 and is locked in place by the camming member 34 when the surface 70 of the flexible member 60 is disposed below the lower end surface 72 of the camming member 34.

The insertion and removal motions for the keyboard module 12 are indicated by the arrows in FIG. 3. The keyboard module 12 is inserted into the keyboard frame 14 of the calculator 10 by first orienting and intermeshing the prongs 42 and 40 of the keyboard module 12 and the keyboard frame 14, respectively. The prongs 40 and 42, the keyboard module 12 and the opening 86 are designed so that when the prongs 40 and 42 intermesh, ribs 90 in the opening 86 cooperate with stabilizing ribs 92 on the module frame 44 to guide the keyboard module 12 in at an angle of 14° and thus prevent the module 12 from becoming horizontal before the printed circuit board 54 is plugged into the connector 22, which is connected via output leads to the main keyboard 18. The connector 22 for receiving the plug 55 of the printed circuit board is oriented (as will be described in greater detail below) at a 14° angle indicated by $\theta$ to facilitate insertion. Once the prongs 40 and 42 are intermeshed at a 14° angle from the horizontal, rotation of the keyboard module 12 by pushing down the front end thereof locks the keyboard module 12 into place with an electrical connection established between the printed circuit board plug 55 and the connector 22. With the keyboard module 12 in place, the tab 62 of the flexible member 60 extends into the aperture 36 of the bottom cover 16, as indicated by the dotted lines in FIG. 3.

The keyboard module 12 is removed by manually pushing up on the tab 62 so that the surface 70 of the camming portion 64 of the flexible member 60 is disengaged from the lower end surface 72 of the camming member 34. The spring loading (see FIG. 4) of the connector 22 causes the keyboard module 12 to pop up.

Referring now to FIG. 4, there is shown a portion of the printed circuit board plug 55 poised at a 14° angle for insertion into the connector 22. The connector 22 is housed within a block 80 which slidably and rotatably holds the connector 22. The block 80 is supported on the bottom cover 16 within recesses 81 (see FIG. 6) of the bracket 20. The connector assembly also includes a shaft 82 having at one end a pin 83 which is insertable into an aperture (not shown) in the rear of the connector 22. A spring 84 is mounted as shown on the other end of the shaft 82 against a stop 85 on the shaft 82 between the block 80 and the bracket 20. Thus, the spring 84 normally biases the connector 22 with the shaft 82 having a longitudinal axis L which is oriented within the block 80 at an angle $\theta$ equal to 14° with respect to a horizontal plane indicated as P in FIG. 3.

Further details of the construction of the bracket 20, the connector 22, the shaft 82, and the spring 84 are shown in FIG. 6 which also shows the printed circuit board plug 55 oriented for insertion into the connector 22 which in turn has output wires 86 leading to and connected to the main keyboard 18. The entire connector assembly is mounted on a mounting block and secured to the keyboard frame 14 by means of plurality of screws 88.

Figure 2:
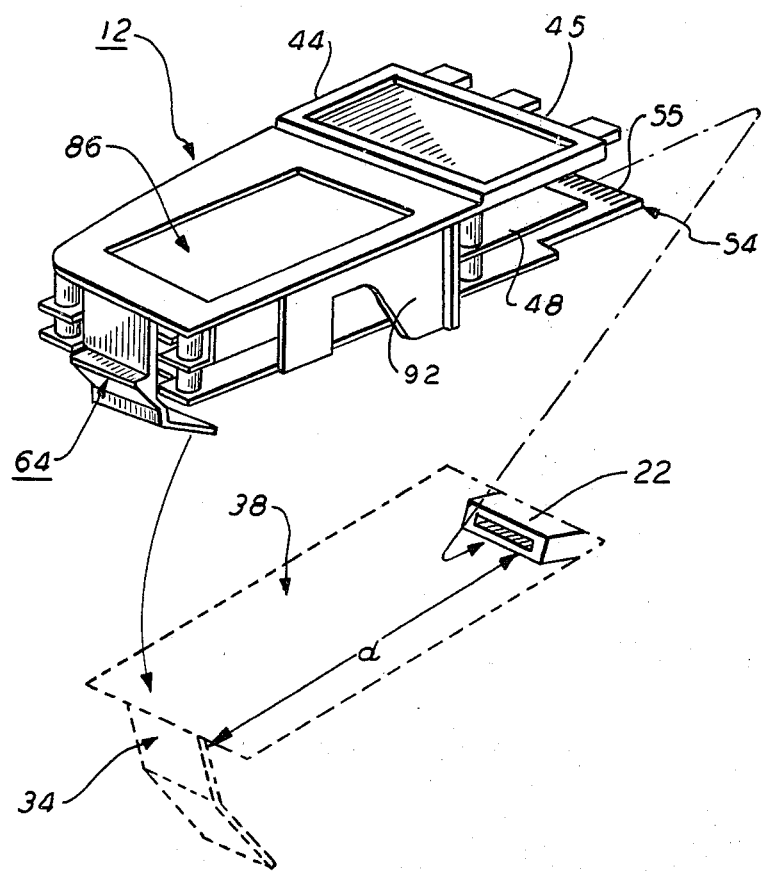
FIG. 2 is a perspective view of a keyboard module constructed in accordance with the invention.
Figure 5:
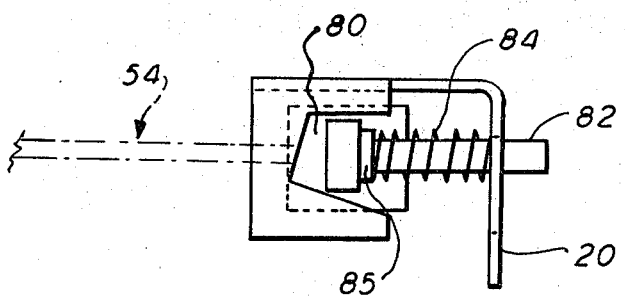
FIG. 5 is a side view, partially in cross section, of the mechanism for receiving the printed circuit board plug of the keyboard module after the insertion of the module into the calculator.

FIG. 2 shows a perspective view the cooperating parts of the keyboard module 12. There is shown a module frame 44 having attached thereto a printed circuit board 54 with a plug 55, the keyboard module frame 48, and an aperture 86 in which the keys 50 are inserted. The keyboard module 12 is shown ready for insertion into the opening 38 in the keyboard frame 14. As was described above, the printed circuit board plug 55 is inserted into the connector 22 and, since the connector 22 is floating by means of a spring loading mechanism, the distance d or space between the camming member 34 and the connector 22 is adjustable or variable as necessary to accommodate the printed circuit board plug 54 and the camming means 64 and differences in lengths of different keyboard modules 12.

While the invention has been described with respect to one preferred embodiment thereof, it will be appreciated that various modifications therein in form and detail may be made within the spirit and scope of the appended claims.

What is claimed is:

1. In a calculator comprising:
    a main keyboard;
    a housing connected to the main keyboard and having an opening therein;
    a keyboard module for insertion into the opening, the keyboard module having a second keyboard including at least one key switch, electrical circuit means connected to the key switch, first connecting means for electrically connecting the circuit means to the calculator, and a module frame supporting the second keyboard, the electrical circuit means and the connecting means, the improvement comprising:
    second connecting means disposed in the opening for electrically connecting the first connecting means in the keyboard module to the calculator, the second connecting means being movable at least in the direction of insertion of the module into the opening, whereby keyboard modules of different sizes are insertable into the opening.

2. A calculator according to claim 1 wherein the second connecting means is also rotatable and normally positioned in a preferred orientation for insertion of the keyboard module, whereby the first connecting means is first inserted into the second connecting means in the preferred orientation and then the keyboard module is next rotatably inserted in place into the opening.

3. A calculator according to claim 2 wherein the preferred orientation is substantially 14 degrees from the horizontal.

4. A calculator according to claim 2 further comprising means disposed within the opening for cooperating with the keyboard module frame to position the keyboard module at the preferred orientation during insertion of the keyboard module.

5. A calculator according to claim 4 wherein the means for cooperating with the keyboard module comprises at least one rib projecting from the side of the opening.

6. A calculator according to claim 4 wherein the keyboard module further comprises:
   locking means connected to the keyboard module for locking the keyboard module in place when the keyboard module has been inserted in the opening, and
   releasing means for releasing the locking means and permitting removal of the keyboard module from the opening.

7. A calculator according to claim 6 wherein the second connecting means also mechanically connects the keyboard module to the calculator and further comprising:
   means for automatically returning the second connecting means to the preferred orientation when the releasing means releases the locking means, whereby the keyboard module is automatically returned to the preferred orientation, at least partially outside of the opening after the releasing means releases the locking means.

8. A calculator according to claim 7 wherein the locking means is connected to the releasing means, both the locking means and the releasing means are disposed within the opening when the keyboard module has been inserted in the opening, and the calculator further comprises a second opening in the housing adjacent the releasing means when the keyboard module has been inserted into the opening, whereby the releasing means is accessible from the exterior of the housing.

9. In a calculator including a housing with an opening therein and a module for insertion into said opening, the module comprising:
   a keyboard including at least one keyswitch;
   circuit means connected to the keyboard;
   connection means for electrically connecting the circuit means to the calculator;
   a module frame supporting the keyboard, the circuit means and the connection means;
   singular locking means comprising a flexible camming member connected to the module frame and extending into the opening in the calculator housing for locking the module in the opening in the calculator housing; and
   singular releasing means comprising a tab connected to the flexible camming member for releasing the module and permitting removal of the module from the opening in the calculator housing, wherein the improvement comprises:
   a second opening in the housing of the calculator adjacent to the tab when the module is locked in the opening in the calculator housing, said second opening rendering the tab accessible from the exterior of the housing and permitting the flexible camming member to be released for removal of the module from the exterior of the housing.

10. The arrangement according to claim 9 wherein the housing has a bottom cover and the second opening is disposed in the bottom cover adjacent the front of the housing.

* * * * *